Sept. 13, 1966  F. HEBBERLING  3,272,679
APPARATUS FOR FORMING REINFORCED SHEET MATERIAL
Filed July 5, 1963  4 Sheets-Sheet 1
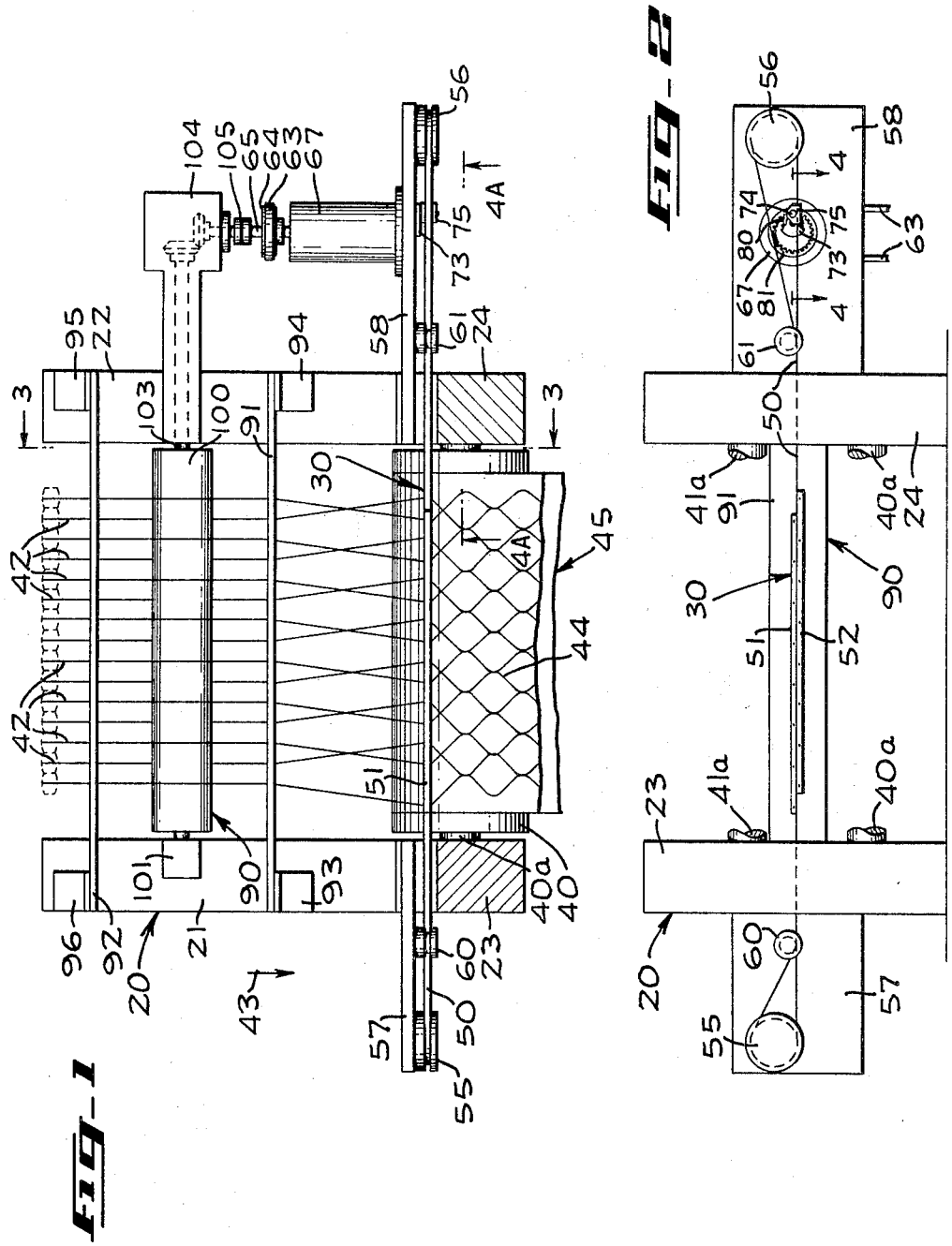
INVENTOR.
FRIEDRICH HEBBERLING
BY
Jack M. Wiseman
ATTORNEY

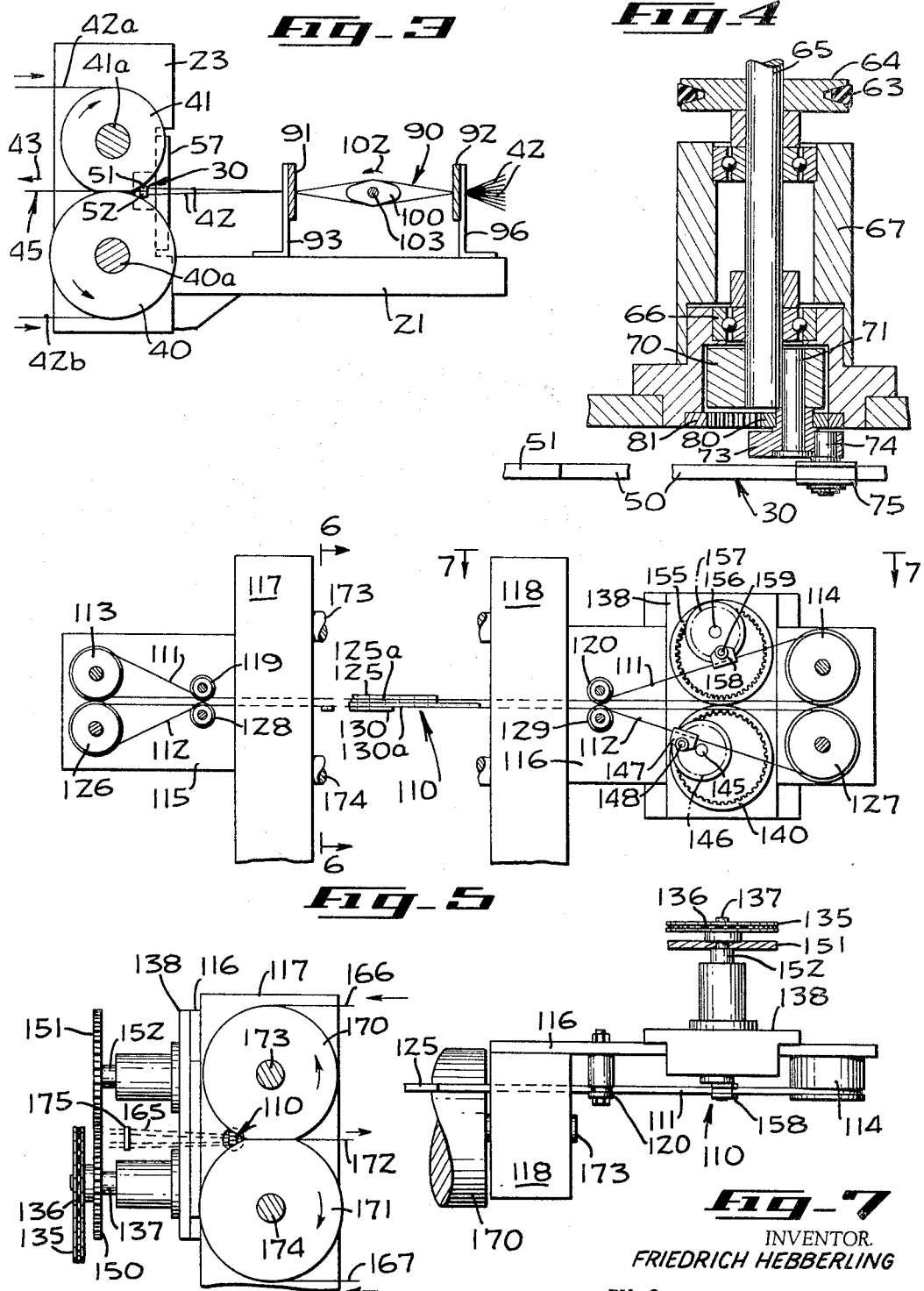

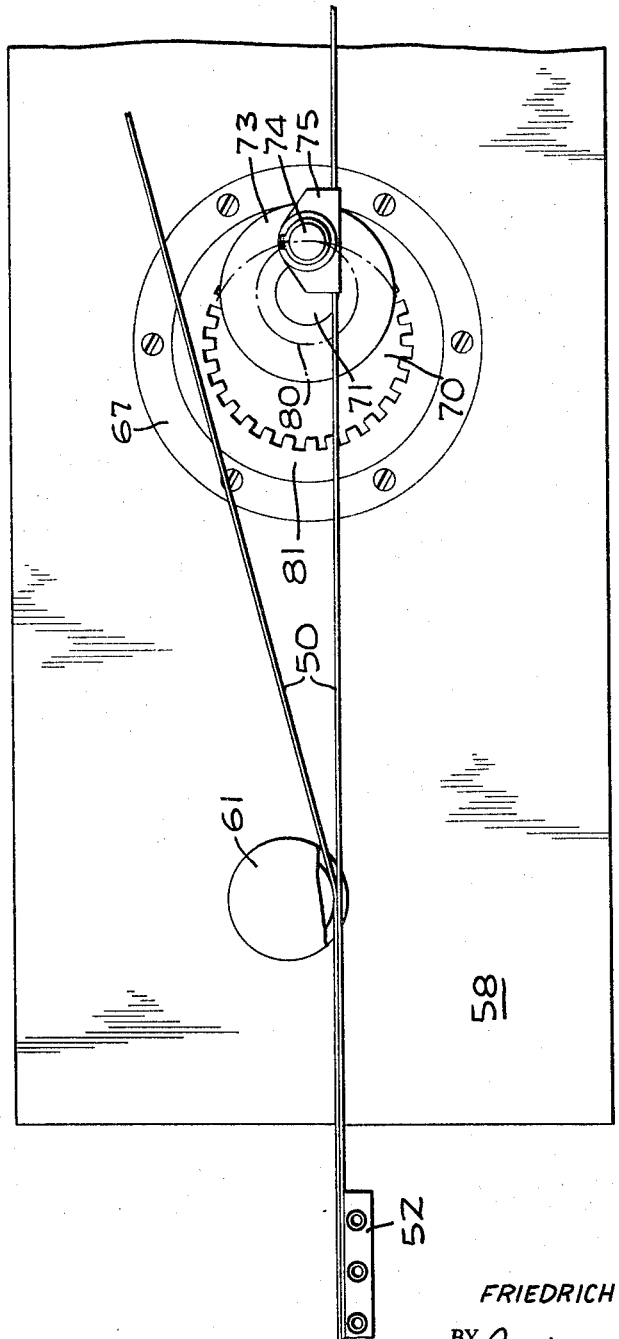

Sept. 13, 1966  F. HEBBERLING  3,272,679
APPARATUS FOR FORMING REINFORCED SHEET MATERIAL
Filed July 5, 1963  4 Sheets-Sheet 4
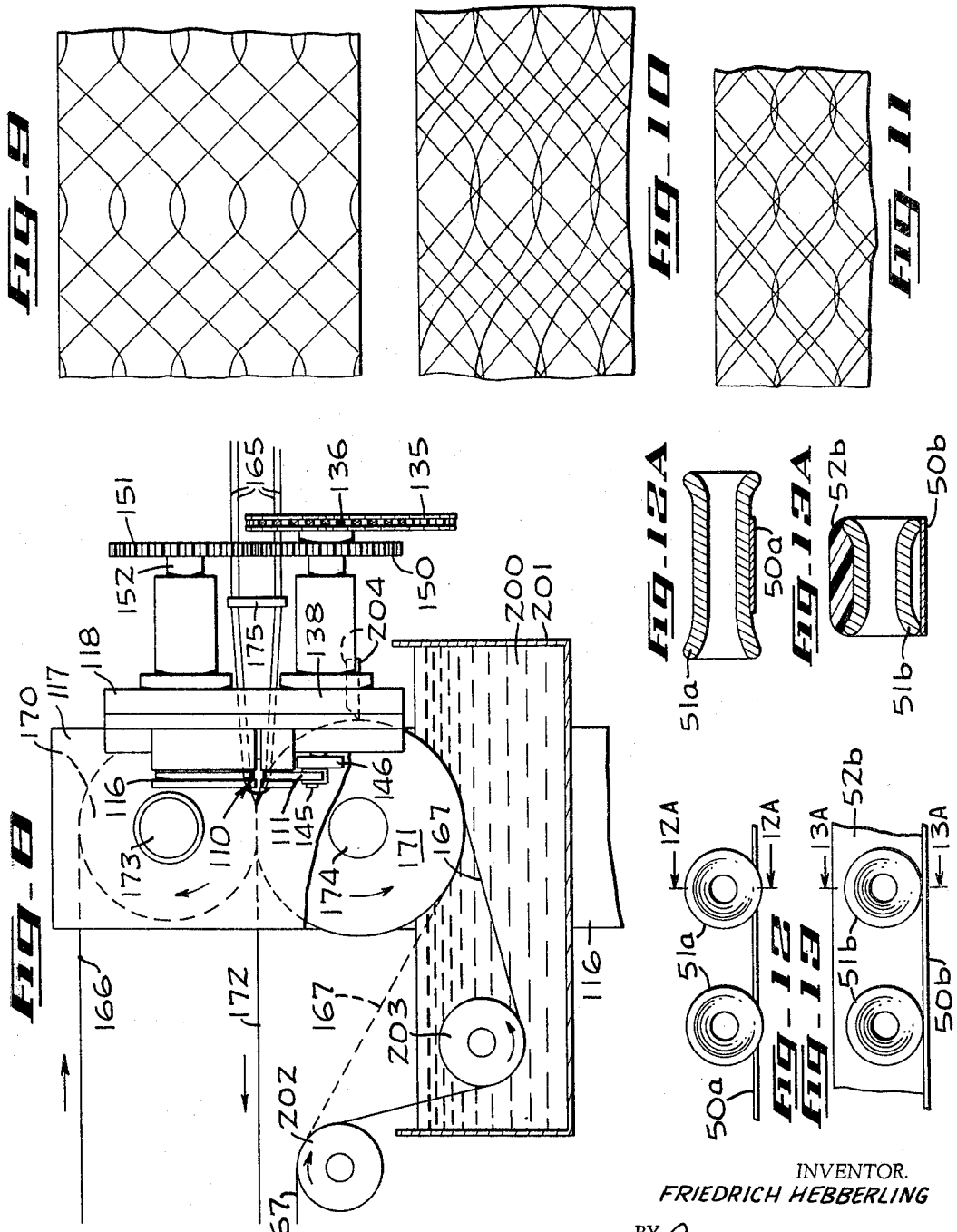
INVENTOR.
FRIEDRICH HEBBERLING
BY
ATTORNEY United States Patent Office  3,272,679
Patented Sept. 13, 1966

3,272,679
APPARATUS FOR FORMING REINFORCED SHEET MATERIAL
Friedrich Hebberling, 527A Tyrella,
Mountain View, Calif.
Filed July 5, 1963, Ser. No. 292,980
14 Claims. (Cl. 156—440)

The present invention relates to the method of and apparatus for forming reinforced sheet material.

This invention is an improvement over the method and apparatus for forming reinforced sheet material disclosed in my copending application, Serial No. 80,477 filed January 3 1961, for Reinforced Sheet Material and Method of and Apparatus for Forming Same.

It has been found that the output of a machine for forming reinforced sheet material is generally limited by the speed of operation of the reciprocating mechanism which imparts a cyclical motion to the strands of reinforcing material. The speed of operation for the reciprocating mechanism is limited in part by its mass. Other factors affect the speed, such as the dynamic forces and the vibrations, but, even these factors are influenced by the mass of the reciprocating mechanism. Therefore, to improve the speed of operation of a reciprocating mechanism, the mass thereof should be reduced or minimized.

An object of the present invention is to provide an improved machine for forming reinforced sheet material.

Another object of the present invention is to provide an improved method for forming reinforced sheet material.

Another object of the present invention is to provide an improved reciprocating mechanism for a machine that forms reinforced sheet material.

Another object of the present invention is to provide a machine for forming reinforced sheet material that has an improved operating speed and has an increased output of the reinforced sheet material.

Another object of the present invention is to provide a reciprocating mechanism of reduced mass and of increased strength.

Another object of the present invention is to provide a web forming machine with more accurate guidance of the strands of reinforcing material.

Another object of the present invention is to provide a web forming machine for forming reinforced sheet material with a more accurate and precise pattern amplitude for the strands of reinforcing material.

Another object of the present invention is to provide a web forming machine wherein the strands of reinforcing material fed to the reciprocating apparatus have a more uniform velocity, and in addition thereto, the tension exerted thereon is also more uniform.

Another object of the present invention is to provide improved bonding for the forming of reinforced sheet material.

Another object of the present invention is to provide an improved pattern for the strands of reinforcing material of a reinforced web.

Other and further objects and advantages of the present invention will be apparent to one skilled in the art from the following description taken in conjunction with the accompanying drawings, in which:

FIG. 1 is a schematic top view of the reciprocator mechanism of the present invention illustrated with a lower nip roll and the laminated web advancing therefrom.

FIG. 2 is a schematic fragmentary rear view of the mechanisms shown in FIG. 1 with the nip rolls thereof removed to more clearly illustrate the reciprocator mechanism.

FIG. 3 is a schematic vertical sectional view taken substantially along line 3—3 of FIG. 1.

FIG. 4 is an enlarged schematic horizontal sectional view taken substantially along line 4—4 of FIG. 2 to show the drive arrangement for the reciprocator mechanism.

FIG. 4A is an enlarged schematic elevational view of the reciprocator drive mechanism taken along line 4A—4A of FIG. 1.

FIG. 5 is a schematic front elevational view of a modified reciprocator drive mechanism similar to FIG. 2, but for a reciprocator with two reciprocating tapes.

FIG. 6 is a schematic elevational view partially in section taken along line 6—6 of FIG. 5.

FIG. 7 is a schematic elevational view partially in section taken along line 7—7 of FIG. 5.

FIG. 8 is a fragmentary schematic side elevational view partially in section of the reciprocator shown in FIGS. 5–7, illustrated with nip rolls and arrangement for applying a bonding agent.

FIG. 9 is a plan view of a reinforcing matrix formed by the reciprocating and guidance mechanisms of the present invention.

FIG. 10 is a plan view of another reinforcing matrix formed by the reciprocating and guidance mechanisms of the present invention.

FIG. 11 is a plan view of still another reinforcing matrix formed by the reciprocating and guidance mechanisms of the present invention.

FIG. 12 is a modification of the strand guide arrangement on an endless reciprocating tape for the reciprocating mechanism.

FIG. 12A is a vertical section taken along line 12A—12A of FIG. 12.

FIG. 13 is a further modification of the strand guide arrangement on an endless reciprocating tape for the reciprocating mechanism.

FIG. 13A is a vertical section taken along line 13A—13A of FIG. 13.

In the present invention for forming reinforced sheet material, two sheets of material are bonded together with a matrix of reinforcing material disposed therebetween. The matrix is formed from reinforcing strands of filamentary material that have a cyclical motion imparted thereto immediately prior to the depositing of the strands between the two sheets of material. A detailed description of the machine and method in general for carrying out the foregoing is disclosed in my aforementioned copending application, Serial No. 80,477, filed on January 3, 1961, for Reinforced Sheet Material and Method of and Apparatus for Forming Same.

Illustrated in FIGS. 1 and 2 is a suitable support structure 20 comprising transversely spaced, longitudinally extending side members 21 and 22. At the rear ends thereof, are upright posts 23 and 24.

Carried by the support structure 20 is a reciprocating mechanism 30 (FIGS. 1-4) for imparting the cyclical motion to the strands of filamentary material. Disposed rearwardly of the reciprocating mechanism 30 or at the output end of the machine for forming reinforced sheet material are nip rolls 40 and 41 (FIG. 3). In FIG. 1, the upper nip roll 41 has been removed to more clearly illustrate the reciprocating mechanism 30. For a similar reason, only shafts 40a and 41a, which support the nip rolls 40 and 41, respectively, for rotation are shown in FIG. 2.

Strands of filamentary material 42, such as glass or plastic fibers, are removed from packages, shown in dotted lines in FIG. 1, which are supported by creels. The reinforcing fibers 42 are advanced in the direction of an arrow 43 (FIG. 1) toward the reciprocating mechanism 30. Simultaneously, vertically spaced sheets of material 42a and 42b, such as paper, plastic or polyethylene film, are advanced so that the confronting surfaces thereof meet between the nip rolls 40 and 41 for bonding together. The sheets of material 42a and 42b may be of different substances. The upper nip roll 41 is a heated roll for the bonding operation and the lower nip roll 40 has a rubber peripheral surface. The reciprocating mechanism 30 (FIGS. 1 and 3) imparts a cyclic motion to the strands 42 of reinforcing material immediately prior to their deposit between the bonded sheets of material 42a and 42b, whereby a reinforcing matrix 44 (FIG. 1) is formed between the bonded sheets of material to form a reinforced web 45.

According to the present invention, the reciprocating mechanism 30 should be of a minimum mass. For this purpose, the reciprocating mechanism 30 comprises an endless reciprocator tape 50 (FIGS. 1 and 2) of high strength steel or other similar material. The material selected for the endless reciprocator tape 50 should provide a high strength to weight ratio. In addition thereto, the endless reciprocator tape 50 lends itself for placement or location in close proximity to where the nip rolls 40 and 41 have peripheral contact (FIG. 3), thereby providing a greater range of adjustment to precisely regulate the deposit amplitude of the reinforcing strands.

Supported by the upper run of the endless reciprocator tape 50 for reciprocating movement therewith is an upper guide bar 51 (FIGS. 1 and 2), and supported by the lower run of the endless reciprocator tape 50 is a lower guide bar 52. The guide bars 51 and 52 may be secured to the reciprocating tape 50 by any suitable means, such as solder or bonding. Formed in the guide bars 51 and 52 are vertically extending apertures having yarn guides therein for receiving therethrough the strands of filamentary material 42.

Shown in FIGS. 12, 12A, 13 and 13A are modifications of the endless reciprocating tape and guide bar arrangement. In FIGS. 12 and 12A is illustrated an endless reciprocator tape 50a similar to the aforementioned reciprocator tape 50. Soldered or brazed onto the endless reciprocator tape 50a are a plurality of laterally spaced strand receiving tubular yarn guides 51a. Likewise in FIGS. 13 and 13A is shown an endless reciprocator tape 50b similar to the aforementioned reciprocator tape 50. Tubular laterally spaced strand receiving members 51b of hardened steel, ceramic or other suitable material are secured to the reciprocator tape 50b by bonding a rubber or plastic strip 52b to the tape 50b and having the tubular members 51b disposed thereinto.

The endless reciprocator tape 50 is trained around pulleys 55 and 56 (FIGS. 1 and 2) which are supported for rotation by upstanding plates 57 and 58, respectively. In turn, the plates 57 and 58 are mounted on the posts 23 and 24, respectively. Spaced inwardly from the pulleys 55 and 56 and also mounted on the plates 57 and 58, respectively, are pulleys 60 and 61 of reduced diameters, which serve to guide the upper run of the endless tape 50 so that the upper and lower runs of the endless tape 50 are substantially in juxtaposition. The pulleys 55, 56, 60 and 61 are preferably of light weight ball bearing types with very thin races.

For imparting reciprocating movement to the endless reciprocator belt 50, an endless drive belt 63 (FIGS. 1 and 2) may be trained around any suitable drive sheave, not shown. In the preferred embodiment, the reciprocating mechanism 30 is driven by a drive mechanism that is coupled to the nip rolls 40 and 41. Through such a common drive arrangement, the reciprocator speed will be maintained in the proper relation with the web speed so that the speed ratio $$\frac{\text{reciprocating speed}}{\text{web speed}}$$

may be maintained constant.

The drive belt 63 is also trained around a driven sheave 64 for rotating the same. In turn, the driven sheave 64 is fixed to a drive shaft 65 for imparting rotary movement thereto. The drive shaft 65 is journalled for rotation by suitable bearings 66, which are retained by a suitable housing 67. The housing 67 is mounted on the upright plate 58.

Fixed to the drive shaft 65 for rotation therewith is a disc 70 (FIG. 4) having a bore therethrough which is parallel to the drive shaft 65 but spaced radially therefrom. Seated in the bore for rotation with the disc 70 is a pin 71. The axis of the pin 71 is parallel with the axis of the disc 70 and the drive shaft 65.

Carried by the pin 71 for rotation therewith is a disc 73. Formed in the disc 73 is a bore which is parallel with the axis thereof and spaced radially therefrom. Disposed within the bore of the disc 73 is a pin 74 that rotates with the disc 73. Secured to the pin 74 is a tape shoe 75 that is clasped to the reciprocating tape 50 for imparting a reciprocating movement to the endless reciprocating tape 50.

Fixed to a reduced diameter portion of the disc 73 is a gear 80 having external teeth. Meshing with the gear 80 is a epicyclic train plate plate 81 having internal teeth. The epicyclic plate 81 has the periphery thereof secured in fixed relation to the housing 67.

In the operation of the epicyclic or planetary drive arrangement for the reciprocator mechanism 30, the endless drive belt 63 rotates the drive shaft 65 through a sheave 64. The drive shaft 65 rotates a disc 70 causing the disc 73 to rotate about an epicyclic path having an axis displaced radially from the axis of the disc 70 by means of the pin 71. Attached to the disc 73 is a gear 80 that travels about an epicyclic path by meshing with the teeth of an epicyclic train plate 81.

The tape shoe 75 by means of the pin 71 also travels in the epicyclic path having its axis spaced from the axis of the disc 73. While the tape shoe 75 travels in an epicyclic path, it does have a reciprocating displacement. Since the tape shoe 75 is fastened or clasped to the endless tape 50, a reciprocating movement in a rectilinear path is thereby imparted to the upper and lower runs of the endless tape 50 between the pinch pulleys 60 and 61 and in so doing the guide bars 51 and 52 are always 180 degrees out of phase with one another.

It has been found that strands of reinforcing material as they leave the packages and approach the reciprocating mechanism 30 are subject to tension and velocity fluctuations. Such tension and velocity fluctuations may cause an erratic pattern in the matrix 44. For overcoming these conditions, the present invention includes a tension compensator 90 (FIGS. 1 and 3). As shown in FIGS. 1 and 3, the tension compensator is disposed between longitudinally spaced fixed strand guides 91 and 92. The fixed strand guides 91 and 92 are fixed to the transversely spaced support members 21 and 22 by brackets 93–96.

The tension compensator 90 comprises a transversely disposed strand engaging member 100, which is journalled for rotation by suitable means, such as a pillow block 101. The configuration of the strand engaging member 100 is determined by the degree of fluctuations of the velocity and the tension of the reinforcing strands 42. For rotating the strand engaging member in the direction of the arrow 102 (FIG. 3), its shaft 103 is received by a miter gear box 104 (FIG. 1) which includes a driven bevel gear and a drive bevel gear. The drive bevel gear is fixed to a shaft that is connected to the drive shaft 65 by shaft coupling means 105. Thus, it is to be observed that the rotation of the strand engaging member 100 is synchronized with the operation of the reciprocator mechanism 30.

Illustrated in FIGS. 5–7 is a reciprocating mechanism 110, which is a modification of the reciprocating mechanism 30 and employs two endless reciprocating tapes 111 and 112. The upper reciprocating tape 111 and the lower reciprocating tape 112 are made of high strength steel or other suitable material of the type that provides a high strength to weight ratio.

The upper endless reciprocating tape 111 is trained around two pulleys 113 and 114, which are spaced apart in the transverse direction. As shown in FIG. 5, the diameter of the pulley 114 is greater than the diameter of the pulley 113. The pulleys 113 and 114 are mounted on upright transversely spaced and disposed plates 115 and 116, respectively, for rotation. In turn, the transverse plates 115 and 116 are fixed to upright, longitudinally extending blocks 117 and 118, respectively.

Interposed between the pulleys 113 and 114 are pinch pulleys 119 and 120, which are mounted on the plates 115 and 116, respectively, for rotation and serve to guide the upper run of the upper endless reciprocating tape 111 therebetween in juxtaposition with the lower run of the upper endless reciprocating tape 111 therebetween. Supported by the upper and lower runs of the upper endless reciprocating tape 111 for movement therewith are guide bars 125 and 125a, respectively, or other suitable strand receiving members. The guide bars 125 and 125a are located on the tape 111 between the pinch pulleys 119 and 120.

The lower endless reciprocating tape 112 is similarly trained around transversely spaced pulleys 126 and 127 that are mounted on the support plates 115 and 116, respectively, for rotation. As shown in FIG. 5, the diameter of the pulley 127 is greater than the diameter of the pulley 126. The pulley 126 is in vertical alignment with the pulley 113 and the pulley 127 is in vertical alignment with the pulley 114.

Interposed between the pulleys 126 and 127 in transverse alignment are pinch pulleys 128 and 129, which are mounted on the support plates 15 and 116 in vertical alignment with the pinch pulleys 119 and 120, respectively. The pinch pulleys 128 and 129 serve to guide the lower run of the lower endless reciprocating tape 112 therebetween in juxtaposition with the upper run of the lower endless reciprocating tape 112 therebetween. Supported by the upper and lower runs of the lower endless reciprocating tape 112 for movement therewith are guide bars 130 and 130a, respectively, or other suitable strand receiving members. The guide bars 130 and 130a are located on the tape 112 between the pinch pulleys 128 and 129.

The drive arrangement for the reciprocating mechanism 110 includes an endless drive chain 135 (FIGS. 6–8) that is trained around a driven sprocket 136. The sprocket 136 is fixed to a lower drive shaft 137 for imparting rotation thereto. The reciprocating mechanism 110 is driven by the drive arrangement for the nip rolls. Alternatively, the shaft 137 could be driven independently by a variable speed motor, not shown.

As shown in FIGS. 5–7, the lower drive shaft 137 is journalled for rotation by ball bearings, not shown, retained in a conventional manner by a housing 138. The housing 138 is secured to the support plate 116 by suitable means, such as nuts and bolts. Fixed to the housing 138 is an internally geared lower epicyclic plate 140 (FIG. 5). The axis of the epicyclic plate 140 is coincident with the axis of the lower drive shaft 137.

Secured to the lower drive shaft 137 for rotation therewith is a disc, not shown, which is similar to the disc 71 of FIG. 4. Carried by the disc, not shown, for rotation therewith is a pin 145 that has its axis spaced radially from the axis of the lower drive shaft 137. The pin 145 supports a disc 146 (FIG. 5) for rotation. Attached to the disc 146 is a gear, not shown, with external teeth. This gear is similar to the gear 80 of FIG. 4 and meshes with the internal teeth of the plate 140 to travel in an epicyclic path. Carried by the disc 146 for rotation therewith is a lower tape shoe 147 that clasps and grips the lower endless reciprocating tape 112. The lower tape shoe 147 is supported by a pin 148 that has its axis displaced radially from the axis of the pin 145. Through the foregoing epicyclic and planetary gear drive arrangement, the lower tape shoe 147 in its travel over an epicyclic path imparts a reciprocating and rectilinear movement to the lower endless reciprocating tape 112 between the pulleys 128 and 129.

Attached to the lower drive shaft 137 for rotation therewith is a spur gear 150 (FIG. 6) that meshes with a spur gear 151 to impart rotation thereto. The spur gear 151 is fixed to an upper drive shaft 152 for imparting rotary movement thereto. The drive shaft 152 is journalled in the housing 138 for rotation by suitable ball bearings, not shown. Fixed within the housing 138 in vertical alignment with the lower epicyclic plate 140 (FIG. 5) is an upper epicyclic plate 155. The axis of the plate 155 is coincident with the axis of the upper drive shaft 152.

Secured to the upper drive shaft 152 for rotation therewith is a disc, not shown, which is similar to the disc 70 of FIG. 4. Carried by the disc, not shown, for rotation therewith is a pin 156 that has its axis spaced radially from the axis of the upper drive shaft 152. The pin 156 supports a disc 157 (FIG. 5) for rotation. Attached to the disc 157 is a gear, not shown, with external teeth. This gear is similar to the gear 80 of FIG. 4 and meshes with the internal teeth of the plate 155 to travel in an epicyclic path. Carried by the disc 157 for rotation therewith is an upper tape shoe 158 that clasps and grips the upper endless reciprocating tape 111. The upper tape shoe 158 is supported by a pin 159 that has its axis displaced radially from the axis of the pin 156. Through this epicyclic and planetary gear arrangement, the upper tape shoe 158 in its travel over an epicyclic path imparts a reciprocating and rectilinear movement to the upper endless reciprocating tape 111 between the pulleys 119 and 120.

Strands 165 (FIGS. 6 and 8) of reinforcing material are advanced from packages on creels, not shown, toward the reciprocating mechanism 110 wherein a cyclic motion is imparted thereto. Simultaneously, vertically spaced sheets 166 and 167 are advanced to that the confronting surfaces thereof meet between the peripheral contacting surfaces of nip rolls 170 and 171. The lower nip roll 171 has a rubber sleeve thereon and the upper nip roll 170 may be a heated unit for bonding the sheets of material together dependent on whether a bonding adhesive is employed. The reciprocating unit 110 imparts the cyclic motion to the strands 165 of filamentary material immediately prior to the deposit thereof between the sheets of material to form a reinforcing matrix, whereby a web material 172 advances beyond the nip rolls 170 and 171. According to the present invention, the sheets of material in a web may be of different substances selected from paper, polyethylene, plastic, et cetera.

The nip rolls 170 and 171 are supported by shafts 173 and 174, respectively, which are journalled on the blocks 117 and 118 for rotation. Suitable drive means, not shown, impart continuous rotation to the nip rolls 170 and 171. When two endless reciprocating tapes are employed, there is no need for the compensator mechanism to maintain a constant velocity and tension on the reciprocating strands. Further, only one stationary guide bar, such as fixed guide bar 175, is required.

From the foregoing, it is to be observed that there are four movable strand guide bars operating simultaneously in reciprocating movements. As a result thereof, the phase shift between the guide bars carried by the same reciprocating tape is 180 degrees. For example, the guide bars 125 and 125a are 180 degrees out of phase with one another. Likewise, the guide bars 130 and 130a are 180 degrees out of phase with one another. This relationship is always maintained, since the guide bars are mounted on the upper and lower runs respectively of the same endless reciprocating tape. As between the guide bars 125 and 130 there is a phase difference of 90 degrees. The endless reciprocating tapes 111 and 112 are 90 degrees out of phase with one another through the arrangement of the spur gears 150 and 151 (FIG. 6).

For improving the tear and puncture resistance of web laminate by adequate penetration of all layers of the laminate with the bonding adhesive, the preferred embodiment of the present invention employs a hot-melt polyethylene or a hot-melt bonding chemical or adhesive. It has been found that the hot-melt adhesive can penetrate paper and other porous material with facility, since it melts at approximately 300° F. and has at this temperature the required low viscosity.

According to the present invention, a hot-melt chemical 200 (FIG. 8) is contained by a hot-melt chemical tank 201. The tank 201 is mounted below the nip roll 171, which has the rubber peripheral sleeve, so that the outer cylindrical wall of the nip roll 171 is partially submerged within the hot-melt chemical.

The lower sheet of material 167 is guided in its movement toward the tank 201 by a guide roll 202. Submerged within the tank 201 and mounted therein for rotation is another guide roll 203 for guiding the movement of the sheet of material 167 toward the nip roll 171. If only one side of the sheet of material is to have adhesive applied thereto, the guide roll 203 can be eliminated and the sheet of material 167 will advance as shown in dotted line FIG. 8 toward the nip roll. A conventional doctor blade 204 is mounted adjacent the nip roll 171 for maintaining the film thickness applied to the lower sheet of material 167 at a desired level.

Illustrated in FIG. 9 is a multiple overlap pattern of a reinforcing net formed by the single reciprocating tape mechanism 30 of the present invention. The multiple overlap pattern of reinforcing strands improve the tear and puncture resistance of the laminated web. The multiple overlap pattern of FIG. 9 can be further improved for tear and puncture resistance by increasing the order of overlap regions of the sinusoidal configurations.

The disadvantage of the pattern shown in FIG. 9 is that it includes "bands" that appear cyclically. These bands are areas of essential one-dimensional reinforcement. To eliminate bands, the patterns of FIGS. 10 and 11 are employed.

In FIGS. 10 and 11 are shown multiple overlap patterns for improved tear and puncture resistance. The patterns are generated by the reciprocating mechanism 110 of the present invention having two endless reciprocating tapes which form a first multiple overlap pattern and then superposes a second multiple overlap pattern, but with a phase delay in the superposing pattern of 90 degrees. It is recalled that the spur gears 150 and 151 (FIG. 6) provide the 90 degree phase shift relationship.

In the operation and method of the present invention, sheets of porous material 166 and 167 (FIG. 8), such as paper or plastic material, such as polyethylene or the like, are advanced toward the nip rolls 170 and 171, respectively. The sheet 166 may be referred to as laminum and the sheet 167 may be referred to as substratum, since they may be of different substances. The substratum retains its strength at higher temperatures than the laminum. As the sheet 167 advances toward the nip roll 171, a coating of hot-melt polymer of ethylene type plastic is applied thereto and particularly the upper surface thereof as an adhesive.

While the sheets of material 166 and 167 are advancing toward the peripheral surfaces of the nip rolls 170 and 171 that are confronting one another, the strands of reinforcing material 165 are advancing toward the same region. The reciprocating apparatus 110 imparts a cyclic motion to the strands of reinforcing material 165 immediately prior to the deposit thereof between the sheets 166 and 167 as they enter the aforementioned region. The reinforcing matrix interposed between the sheets of material 166 and 167 is of the previously described superposed pattern (FIGS. 9–11).

Immediately after the strands 165 have the cyclic motion imparted thereto by the reciprocating mechanism 110, they are deposited between the sheets of material 166 and 167, and without any delay, the sheets of material 166 and 167 are bonded together with the reinforcing matrix interposed therebetween to form the web material 172. The bonding occurs immediately after the strands 165 have the cyclic motion imparted thereto and occurs mainly as the sheets of material 166 and 167 confront one another in advancing between the contacting peripheral surfaces of the nip rolls 170 and 171.

When the hot-melt chemical adhesive is employed in the tank 200, the nip roll 170 may be heated. In the event the hot-melt chemical adhesive is not employed as a bonding agent and if the film material 166 heat softens readily, then the heat is supplied solely by the heat roll 170.

Normally, the roll 170 is heated for bonding and the roll 171 is a cold roll. The heated roll 170 has a temperature below the critical temperature of the substrate sheet 167 and above the temperature at which the laminate sheet 166 provides bonding. While advancing between the confronting surfaces of the nip rolls 170 and 171, the material that heat softens readily, such as the sheet 167, adheres to the sheet 166.

From the apparatus disclosed in FIG. 8, an improved water resistant reinforced sheet material may be formed in that, in addition to the elements previously described for the reinforced sheet material 172, an extra layer of bonding adhesive such as the hot-melt chemical 200 will adhere to the lowermost surface thereof.

It is to be understood that modifications and variations of the embodiments of the invention disclosed herein may be resorted to without departing from the spirit of the invention and the scope of the appended claims.

Having thus described my invention, what I claim as new and desire to protect by Letters Patent is:

1. A reciprocating apparatus for imparting a cyclic motion to strands of filamentary material comprising an endless tape with a plurality of runs, means engaging said tape for imparting a reciprocating movement thereto, and means on one of said runs of said tape for receiving strands of filamentary material.

2. A reciprocating apparatus for imparting a cyclic motion to strands of filamentary material comprising an endless tape with a first and second run, means on said first run for receiving strands of filamentary material, means on said second run for receiving strands of filamentary material, and means engaging said tape for imparting a reciprocating movement thereto.

3. A reciprocating apparatus for imparting a cyclic motion to strands of filamentary material comprising a first endless tape with a plurality of runs, a second endless tape with a plurality of runs disposed adjacent said first tape, means on one of said runs of said first tape for receiving strands of filamentary material, means on one of said runs of said second tape for receiving strands of filamentary material, and means engaging said first and second tapes for imparting reciprocating movements thereto.

4. A reciprocating apparatus for imparting a cyclic motion to strands of filamentary material comprising a first endless tape with a plurality of runs, means on one of said runs of said first tape for receiving strands of filamentary material, drive means engaging said first tape for imparting a cyclic motion thereto, a second endless tape with a plurality of runs disposed adjacent said first said tape, means on one of said runs of said second tape for receiving strands of filamentary material, drive means engaging said second tape for imparting a reciprocating movement thereto, and means responsive to the operation of said first drive means for operating said second drive means.

5. A reciprocating apparatus for imparting cyclic motion to strands of filamentary material comprising a first endless tape with an upper and lower run, means on said upper and lower runs for receiving strands of filamentary material, a second endless tape with an upper and lower run disposed adjacent to said first endless tape, means on the upper and lower runs of said second endless tape for receiving strands of filamentary material, and means engaging said first and second endless tapes for imparting reciprocating movements thereto.

6. In a machine for producing reinforced sheet material, a support structure, a pair of pulleys mounted on said support structure, an endless tape trained around said pulleys, said endless tape having an upper and a lower run, guide means on said support structure disposed between said pulleys for engaging said tape to locate the portions of the upper and lower runs therebetween in juxtaposition, means on said upper and lower runs for receiving strands of filamentary material, and drive means on said support structure disposed between said pulleys for engaging said tape to impart a reciprocating movement thereto.

7. In a machine for forming reinforced sheet material, a support structure, an upper pair of pulleys mounted on said support structure, a lower pair of pulleys mounted on said support structure below said upper pair of pulleys, an upper endless tape trained around said upper pair of pulleys, said upper endless tape having an upper and lower run, means on the upper and lower runs of said upper endless tape for receiving strands of filamentary material, a lower endless tape trained around said lower pair of pulleys, said lower endless tape having an upper and lower run, means on said upper and lower runs of said lower endless tape for receiving strands of filamentary material, a plurality of upper pinch rolls disposed between said upper pulleys in engagement with said upper endless tape for locating said upper and lower runs of upper endless tape into juxtaposition, a plurality of lower pinch rolls disposed between said lower pulleys in engagement with said lower endless tape for locating said upper and lower runs of said lower endless tape into juxtaposition, upper epicyclic drive means engaging said upper endless tape for imparting a reciprocating movement thereto, lower epicyclic drive means engaging said lower endless tape for imparting a reciprocating movement thereto, and means interengaging said upper and lower epicyclic drive means for establishing a drive connection therebetween.

8. In a machine for forming reinforced sheet material, means for supporting a supply of strands of reinforcing material for removal therefrom, nip rolls for advancing the strands of reinforcing material along a predetermined path, a reciprocating mechanism disposed between said means and said nip rolls for receiving the strands of filamentary material and for imparting a cyclic motion thereto, and a compensator device disposed between said means and said reciprocating mechanism in engagement with said strands for compensating for fluctuations in tension on the strands removed from said means.

9. In a machine for forming reinforced sheet material, means for supporting a supply of strands of reinforcing material for removal therefrom, nip rolls for advancing the strands of reinforcing material along a predetermined path, a reciprocating mechanism disposed between said means and said nip rolls for receiving the strands of filamentary material and for imparting a cyclic motion thereto, a compensator bar disposed between said means and said reciprocator mechanism in engagement with said strands, means supporting said compensator bar for rotation, and means connected to said compensator bar for imparting rotary movement thereto in timed relation with strand fluctuations.

10. A reciprocating apparatus for imparting a cyclic motion to strands of filamentary material comprising a first endless tape with a plurality of runs, a second endless tape with a plurality of runs disposed adjacent said first tape, means on one of said runs of said first tape for receiving strands of filamentary material, means on one of said runs of said second tape for receiving strands of filamentary material, and epicyclic means engaging said first and second tapes for imparting reciprocating movements therto.

11. A reciprocating apparatus for imparting a cyclic motion to strands of filamentary material comprising a first endless tape with a plurality of runs, means on one of said runs of said first tape for receiving strands of filamentary material, epicyclic drive means engaging said first tape for imparting a cyclic motion thereto, a second endless tape with a plurality of runs disposed adjacent said first tape, means on one of said runs of said second tape for receiving strands of filamentary material, epicyclic drive means engaging said second tape for imparting a reciprocating movement thereto, and means responsive to the operation of said first drive means for operating said second drive means.

12. A tape for a reciprocating apparatus that imparts cyclic motion to strands of filamentary material comprising an endless belt, and a plurality of elongated tubular strand guides attached to said belt for receiving strands of filamentary material, said tubular strand guides extending in a direction perpendicular to the direction of travel of said belt and spaced along said belt in the direction of travel thereof.

13. A tape for a reciprocating apparatus that imparts cyclic motion to strands of filamentary material comprising an endless belt, a plurality of elongated tubular strand guides for said belt to receive strands of filamentary material, and fastening means receiving said tubular strand guides in supporting relation and fixed to said belt for attaching said tubular strand guides to said belt for movement therewith, said tubular strand guides extending in a direction perpendicular to the direction of travel of said belt and spaced along said belt in the direction of travel of said belt.

14. A reciprocating apparatus as claimed in claim 5 wherein said means engaging said first and second endless tapes for imparting reciprocating movements thereto reciprocates said first and second endless tapes 90° out of phase with one another.

References Cited by the Examiner

UNITED STATES PATENTS

| 627,968 | 7/1899 | Benbow | 68—67 |
|---|---|---|---|
| 1,914,801 | 6/1933 | Chadwick | 156—440 |
| 1,923,837 | 8/1933 | McLaurin | 156—179 |
| 2,026,459 | 12/1935 | Caretta | 74—110 |
| 2,039,312 | 5/1936 | Goldman | 161—59 |
| 2,705,692 | 4/1955 | Petterson | 161—59 |
| 2,772,718 | 12/1956 | Magnuson | 156—177 X |
| 2,812,797 | 11/1957 | Estee et al. | 156—440 |
| 2,893,466 | 7/1959 | Fink | 156—179 |

EARL M. BERGERT, *Primary Examiner.*

P. DIER, *Assistant Examiner.*